US012415905B2

(12) United States Patent
Henze et al.

(10) Patent No.: US 12,415,905 B2
(45) Date of Patent: Sep. 16, 2025

(54) FLAME-RETARDANT THERMOPLASTIC POLYURETHANE

(71) Applicant: BASF SE, Ludwigshafen am Rhein (DE)

(72) Inventors: Oliver Steffen Henze, Lemfoerde (DE); Oliver Muehren, Lemfoerde (DE); Birte Nitz, Lemfoerde (DE); Tanja Lange, Lemfoerde (DE); Sabine Moeller, Lemfoerde (DE); Alfons Bertels, Lemfoerde (DE)

(73) Assignee: BASF SE, Ludwigshafen am Rhein (DE)

(*) Notice: Subject to any disclaimer, the term of this patent is extended or adjusted under 35 U.S.C. 154(b) by 917 days.

(21) Appl. No.: 17/255,656

(22) PCT Filed: Jun. 24, 2019

(86) PCT No.: PCT/EP2019/066618
§ 371 (c)(1),
(2) Date: Dec. 23, 2020

(87) PCT Pub. No.: WO2020/002200
PCT Pub. Date: Jan. 2, 2020

(65) Prior Publication Data
US 2021/0189100 A1 Jun. 24, 2021

(30) Foreign Application Priority Data
Jun. 25, 2018 (EP) .................... 18179577

(51) Int. Cl.
*C08K 5/53* (2006.01)
*C08G 18/32* (2006.01)
*C08G 18/44* (2006.01)
*C08G 18/48* (2006.01)
*C08G 18/66* (2006.01)
*C08G 18/75* (2006.01)
*C08G 18/76* (2006.01)
*C08K 3/22* (2006.01)
*C08K 3/32* (2006.01)
*C08K 5/00* (2006.01)
*C08K 5/52* (2006.01)
*C08K 5/5313* (2006.01)
*C08L 75/08* (2006.01)
*H01B 3/30* (2006.01)
*H01B 7/295* (2006.01)

(52) U.S. Cl.
CPC ........ *C08K 5/5313* (2013.01); *C08G 18/3206* (2013.01); *C08G 18/44* (2013.01); *C08G 18/4854* (2013.01); *C08G 18/664* (2013.01); *C08G 18/6674* (2013.01); *C08G 18/758* (2013.01); *C08G 18/7671* (2013.01); *C08K 3/22* (2013.01); *C08K 3/32* (2013.01); *C08K 5/0066* (2013.01); *C08K 5/5205* (2013.01); *C08L 75/08* (2013.01); *H01B 3/302* (2013.01); *H01B 7/295* (2013.01); *C08K 2003/2241* (2013.01); *C08K 2201/005* (2013.01); *C08K 2201/019* (2013.01)

(58) Field of Classification Search
CPC .......... C08K 5/5313; C08K 3/22; C08K 3/32; C08K 5/0066; C08K 5/5205; C08G 18/3206; C08G 18/44; C08G 18/664; C08G 18/758; C08G 18/7671; C08L 75/08; G08G 18/6674; H01B 3/302; H01B 7/295
See application file for complete search history.

(56) References Cited

U.S. PATENT DOCUMENTS

| 4,314,927 | A | 2/1982 | Theysohn et al. |
| 5,110,850 | A * | 5/1992 | Farkas ............... C08K 5/34922 524/100 |
| 10,501,603 | B2 | 12/2019 | Henze et al. |
| 2013/0059955 | A1* | 3/2013 | Tai .......................... C08K 3/22 524/114 |
| 2013/0081853 | A1 | 4/2013 | Mundra et al. |
| 2013/0310494 | A1 | 11/2013 | Xue et al. |
| 2019/0270884 | A1* | 9/2019 | Henze .................. C08G 18/758 |
| 2022/0325032 | A1 | 10/2022 | Henze et al. |

FOREIGN PATENT DOCUMENTS

| CN | 104693782 A * | 6/2015 | ............. C08L 75/08 |
| CN | 106832884 | 6/2017 | |
| DE | 101 03 424 | 8/2002 | |
| EP | 0 019 768 | 12/1980 | |
| EP | 0 617 079 | 9/1994 | |
| EP | 0 922 552 | 6/1999 | |

(Continued)

OTHER PUBLICATIONS

English machine translation of CN 106832884A. (Year: 2017).*
English machine translation of CN 104693782A. (Year: 2015).*
Rosenberger the MAK-Collection for Occupational Health and Safety Part III, Air Monitoring Methods. Wiley-VCH Verlag GmbH & Co. 2013. (Year: 2013).*
Itou et al., "Halogen-free fire-resistant resin composition and molded body thereof", XP-002786845, Mar. 13, 2014, pp. 1-3.

(Continued)

Primary Examiner — John E Uselding
(74) Attorney, Agent, or Firm — Grüneberg and Myers PLLC

(57) ABSTRACT

The present invention relates to compositions comprising at least one thermoplastic polyurethane, a first phosphorus-containing flame retardant (F1) selected from the group consisting of melamine polyphosphates and a further phosphorus-containing flame retardant (F2) selected from the group consisting of derivatives of phosphinic acid, wherein the composition is free from melamine cyanurate, and to the use of such a composition for the production of cable sheathings.

21 Claims, No Drawings

(56) References Cited

FOREIGN PATENT DOCUMENTS

| EP | 2 476 730 | 7/2012 | |
|---|---|---|---|
| WO | 97/00916 | 1/1997 | |
| WO | 03/066723 | 8/2003 | |
| WO | 2006/072461 | 7/2006 | |
| WO | 2006/121549 | 11/2006 | |
| WO | 2009/086035 | 7/2009 | |
| WO | 2014/179092 | 11/2014 | |
| WO | 2015/128213 | 9/2015 | |
| WO | WO-2017032659 A1 * | 3/2017 | ......... C08G 18/3206 |
| WO | 2018/050498 | 3/2018 | |

OTHER PUBLICATIONS

Vieweg et al., "*Polyurethane*", Kunststoff-Handbuch, Band VII, 1966, pp. 103-113.

U.S. Office Action dated Feb. 23, 2023, in U.S. Appl. No. 17/807,524, 16 pages.

U.S. Appl. No. 17/807,524, filed Jun. 17, 2022, 2022/0325032, Henze et al.

U.S. Office Action dated Dec. 10, 2021 in U.S. Appl. No. 17/438,897, 19 pages.

U.S. Appl. No. 17/438,897, filed Sep. 13, 2021, Henze et a.

\* cited by examiner

FLAME-RETARDANT THERMOPLASTIC POLYURETHANE

The present invention relates to compositions comprising at least one thermoplastic polyurethane, a first phosphorus-containing flame retardant (F1) selected from the group consisting of melamine polyphosphates and a further phosphorus-containing flame retardant (F2) selected from the group consisting of derivatives of phosphinic acid, wherein the composition is free from melamine cyanurate, and to the use of such a composition for the production of cable sheathings.

Cables produced from PVC have the disadvantage of evolving toxic gases on combustion. Therefore, products based on thermoplastic polyurethanes are being developed, these having lower smoke gas toxicities and having good mechanical properties, abrasion resistance and flexibility. Because of the inadequate flammability performance, compositions based on thermoplastic polyurethanes are being developed, these comprising various flame retardants.

Flame-retarded thermoplastic polyurethanes are used especially in cable production as cable sheathings. A common requirement here is also for thin cables having thin cable sheathings which not only pass the relevant flame tests (e.g. VW1) but also have adequate mechanical properties.

The thermoplastic polyurethanes (TPUs) may be admixed either with halogen-containing or halogen-free flame retardants. The thermoplastic polyurethanes comprising halogen-free flame retardants generally have the advantage of evolving less toxic and less corrosive smoke gases when burnt. Halogen-free flame-retarded TPUs are described, for example, in EP 0 617 079 A2, WO 2006/121549 A1 or WO 03/066723 A2. US 2013/0059955 A1 also discloses halogen-free TPU compositions comprising phosphate-based flame retardants.

US 2013/0081853 A1 relates to halogen-free flame-retardant compositions comprising a TPU polymer and a polyolefin and also phosphorus-based flame retardants and further additives. According to US 2013/0081853 A1, the compositions have good mechanical properties.

Melamine cyanurate has also long been known as a flame retardant for engineering plastics. For instance, WO 97/00916 A describes melamine cyanurate in combination with tungstic acid/tungstic acid salts as a flame retardant for aliphatic polyamides. EP 0 019 768 A1 discloses the flameproofing of polyamides with a mixture of melamine cyanurate and red phosphorus.

According to WO 03/066723 A1, materials comprising only melamine cyanurate as a flame retardant have neither a good limiting oxygen index (LOI) nor good flame retardancy, determined, for example, by performance in a UL 94 test in the case of thin wall thicknesses. WO 2006/121549 A1 also describes materials comprising as flame retardants a combination of melamine polyphosphate, phosphinate and borate. These materials do attain high LOI values at low wall thicknesses but do not attain good results in the UL 94 test.

For example, materials which comprise as flame retardants combinations of melamine cyanurate with phosphoric esters and phosphonic esters have good results in UL 94V tests but very low LOI values, for example <25%. Such combinations of melamine cyanurate with phosphoric esters and phosphonic esters are inadequate as flame retardants particularly in the case of sheaths of thin cables. A high LOI value is stipulated by standards for various flame retardancy applications, for example in DIN EN 45545.

TPU materials have a tendency to flow since the urethane linkages are cleaved upon temperature elevation. In vertical flame tests the flowing of the TPU has the result that the material layers facing the flame flow downward and expose new material to the flame. The formation of a stable protective layer is therefore generally only achievable with high flame retardant fill levels. However, these high levels result in a drop in performance, for example a markedly reduced tensile strength.

Accordingly, the compositions known from the prior art either do not exhibit adequate mechanical properties or have only inadequate flammability characteristics, for example flame retardancy and performance, in the UL 94V test.

PCT/EP2015/053192 discloses compositions comprising a thermoplastic polyurethane, melamine cyanurate and a combination of phosphorus-containing flame retardants. According to PCT/EP2015/053192 these compositions have the advantage of good flame retardancy combined with good mechanical properties and good chemicals resistance.

Materials based on thermoplastic polyurethanes having high tensile strengths, high elongations at break and low abrasion values are also often demanded. Such materials are needed for a very wide variety of applications, for example hoses, films and cables but also for injection molded parts. For example VDE standard EN 50363-10-2 stipulates materials for cable sheathings having a tensile strength of at least 25 MPa determined according to DIN EN ISO 527.

Materials based on thermoplastic polyurethanes having a low smoke gas density are also demanded, especially when the products are to be used in sealed spaces. Materials having a low corrosivity of the smoke gases are also advantageous since the damage caused in the case of a fire is thus reduced.

Materials having good UV resistance are also often required. This is especially the case when the articles are exposed to direct sunlight. For example high lightfastness is demanded of colored cables in daily use such as for example electric cables, cables for headphones or data transfer cables.

Very great demands are also placed in respect of the processing of TPU materials. For example the materials are to be homogeneously and uniformly processable by extrusion. Low die abrasion is particularly important here.

The TPU materials should moreover have a good aging resistance and a low susceptibility to hydrolysis.

Finally, the materials should have good media resistance. For example high resistance to various oils is demanded for use in the automotive sector. By contrast, in the computers sector good resistance to ketchup and sun cream are demanded for example.

Starting from the prior art the present invention accordingly has for its object to provide flame-retarded thermoplastic polyurethanes having good mechanical properties and good flame retardancy properties while simultaneously having good mechanical and chemicals resistance and undergoing little, if any, discoloration under UV irradiation. The present invention especially has for its object to provide flame-retarded thermoplastic polyurethanes having good mechanical properties and good flame retardancy properties while simultaneously exhibiting good mechanical and chemicals resistance and high flexibility.

According to the invention this object is achieved by a composition comprising at least the components (i) to (iii):
 (i) a thermoplastic polyurethane,
 (ii) a first phosphorus-containing flame retardant (F1) selected from the group consisting of melamine polyphosphates and
 (iii) a further phosphorus-containing flame retardant (F2) selected from the group consisting of derivatives of phosphinic acid, wherein the composition is free from melamine cyanurate.

The compositions according to the invention comprise at least one thermoplastic polyurethane and a combination of two phosphorus-containing flame retardants (F1) and (F2) and are free from melamine cyanurate.

It has been found that, surprisingly, the compositions of the invention have an optimized profile of properties as a result of the combination of the components of the invention, especially for use as cable sheathing. It has been found that, surprisingly, the compositions according to the invention have improved properties compared to the compositions known from the prior art, for example elevated flame retardancy, and undergo discoloration especially under UV radiation only to a small extent, if at all.

It has been found that even at low proportions of a combination of derivatives of phosphinic acid and melamine polyphosphates a good flame retardancy is achievable, for example of <35%. This flame retardant combination forms a stable protective layer very quickly.

It has been found that, surprisingly, the combination of small amounts of melamine polyphosphates and derivatives of phosphinic acid with a TPU having a weight-average molecular weight greater than 150 000 Dalton results in highly advantageous properties in vertical flame tests. Flowing downward of the outer material layers is prevented not only by the high transforming tendency of the flame retardant mixture but also by the elevated viscosity of the high molecular weight TPU.

As specified the compositions according to the invention comprise a thermoplastic polyurethane as component (i), a first phosphorus-containing flame retardant (F1) selected from the group consisting of melamine polyphosphates as component (ii) and a further phosphorus-containing flame retardant (F2) selected from the group consisting of derivatives of phosphinic acid as component (iii). According to the invention the composition is free from melamine cyanurate. In the context of the present invention "free from melamine cyanurate" is to be understood as meaning that the composition comprises less than 50 ppm of melamine cyanurate, preferably less than 20 ppm of melamine cyanurate. In a preferred embodiment the composition comprises 0 ppm of melamine cyanurate.

In the context of the present application melamine cyanurate is to be understood as meaning inter alia all customary and commercially available product qualities.

Furthermore, the composition according to the invention preferably comprises only small amounts of polyhydric alcohols such as for example 3-, 4-, 5- and 6-hydric alcohols. The composition according to the invention is more preferably free from polyhydric alcohols, in particular free from 3-, 4-, 5- and 6-hydric alcohols.

In a further embodiment the present invention accordingly relates to a composition as described hereinabove, wherein the composition is free from 3-, 4-, 5- and 6-hydric alcohols, for example sugars.

In the context of the present invention "free from 3-, 4-, 5- and 6-hydric alcohols" is to be understood as meaning that the composition comprises less than 50 ppm of polyhydric alcohols, preferably less than 20 ppm of polyhydric alcohols. In a preferred embodiment the composition comprises 0 ppm of polyhydric alcohols According to the invention the flame retardant (F1) is selected from the group consisting of melamine polyphosphates. In the context of the present application melamine polyphosphate is to be understood as meaning inter alia all customary and commercially available product qualities.

Employable in the context of the present invention are melamine polyphosphates that are known per se, for example those having a phosphorus content in the range from 7% to 20% by weight, preferably in the range from 10% to 17% by weight, more preferably in the range from 12% to 14% by weight.

In a further embodiment the present invention accordingly relates to a composition as described hereinabove, wherein the melamine polyphosphate has a phosphorus content in the range from 7% to 20% by weight.

The melamine polyphosphate suitable according to the invention preferably consists of particles typically having an average particle diameter D50 in the range from 0.1 μm to 100 μm, preferably from 0.5 μm to 60 μm, particularly preferably 1 μm to 10 μm. The particles preferably have an average particle diameter D99 of less than 100 μm, more preferably of less than 90 μm. In the context of the present invention the particles preferably have an average particle diameter D50 in the range from 0.1 μm to 100 μm and an average particle diameter D99 of less than 100 μm. In the context of the present invention the particle size distribution may be monomodal or else multimodal, for example bimodal.

In a further embodiment the present invention therefore relates to a composition as described hereinabove, wherein the melamine polyphosphate has a particle size in the range from 0.1 to 100 μm.

A further embodiment preferably employs a melamine polyphosphate which in aqueous solution has a pH in the range from 3 to 7, more preferably in the range from 3.5 to 6.5, particularly preferably in the range from 4 to 6, in each case determined according to ISO 976.

Melamine polyphosphate is present in the composition of the invention in suitable amounts. For example, the proportion of melamine polyphosphate in the composition is in the range from 2% to 35% by weight based on the total composition, in particular in the range from 3% to 30% by weight, preferably composition in the range from 4% to 25% by weight based on the total composition, in particular composition in the range from 5% to 20% by weight based on the total composition.

In a further embodiment the present invention therefore relates to a composition as described hereinabove, wherein the proportion of the melamine polyphosphate in the composition is in the range from 2% to 35% by weight based on the total composition.

The sum of the components of the composition is 100% by weight in each case.

It is preferable when the flame retardant (F2) selected from derivatives of phosphinic acid is selected from salts comprising an organic or inorganic cation or from organic esters. Organic esters are derivatives of phosphinic acid in which at least one oxygen atom bonded directly to the phosphorus has been esterified with an organic radical. In a preferred embodiment the organic ester is an alkyl ester and in another preferred embodiment an aryl ester. It is particularly preferable when all hydroxyl groups of the phosphinic acid have been esterified.

Phosphinic esters have the general formula $R^1R^2(P=O)OR^3$, wherein all three organic groups $R^1$, $R^2$ and $R^3$ may be identical or different. The radicals $R^1$, $R^2$ and $R^3$ are either aliphatic or aromatic and have 1 to 20 carbon atoms, preferably 1 to 10, more preferably 1 to 3. Preferably at least one of the radicals is aliphatic, preferably all of the radicals are aliphatic, very particularly preferably $R^1$ and $R^2$ are ethyl radicals. It is more preferable when $R^3$ too is an ethyl radical or a methyl radical. In a preferred embodiment $R^1$, $R^2$ and $R^3$ are simultaneously ethyl radicals or methyl radicals.

Also preferred are phosphinates, i.e. the salts of phosphinic acid. The $R^1$ and $R^2$ radicals are either aliphatic or aromatic and have 1 to 20 carbon atoms, preferably 1 to 10, more preferably 1 to 3. Preferably at least one of the radicals is aliphatic, preferably all of the radicals are aliphatic, very particularly preferably $R^1$ and $R^2$ are ethyl radicals. Preferred salts of phosphinic acids are aluminum salts, calcium salts or zinc salts, more preferably aluminum salts or zinc salts. A preferred embodiment is diethylaluminum phosphinate.

In a further embodiment the present invention therefore relates to a composition as described hereinabove, wherein the phosphorus-containing flame retardant (F2) is a phosphinate.

In a further embodiment the present invention therefore relates to a composition as described hereinabove, wherein the phosphinate is selected from the group consisting of aluminum phosphinates or zinc phosphinates.

The proportion of the flame retardant (F2) in the composition according to the invention is for example in the range from 5% to 45% by weight based on the total composition, in particular 7% to 40% by weight based on the total composition, preferably in the range from 8% to 38% by weight based on the total composition, in particular in the range from 10% to 35% by weight based on the total composition, more preferably in the range from 12% to 32% by weight based on the total composition, particularly preferably in the range from 15% to 30% by weight based on the total composition.

In a further embodiment the present invention therefore relates to a composition as described hereinabove, wherein the proportion of the flame retardant (F2) in the composition is in the range from 5% to 45% by weight based on the total composition.

The proportion of the sum of the phosphorus-containing flame retardant (F1) and the phosphorus-containing flame retardant (F2) in the composition is preferably in the range from 7% to 40% by weight based on the total composition, more preferably in the range from 10% to 35% by weight, particularly preferably in the range from 15% to 30% by weight, in each case based on the total composition.

In a further embodiment the present invention accordingly relates to a composition as described hereinabove, wherein the proportion of the sum of the phosphorus-containing flame retardant (F1) and the phosphorus-containing flame retardant (F2) in the composition is in the range from 7% to 40% by weight based on the total composition.

It is preferable in the context of the present invention to employ flame retardants (F1) and/or (F2), wherein the particles have an average particle diameter D50 in the range from 0.1 μm to 100 μm, preferably from 0.5 μm to 60 μm, particularly preferably 20 μm to 40 μm. The particles preferably have an average particle diameter D99 of less than 100 μm, more preferably of less than 90 μm. In the context of the present invention the particles preferably have an average particle diameter D50 in the range from 0.1 μm to 100 μm and an average particle diameter D99 of less than 100 μm. In the context of the present invention the particle size distribution may be monomodal or else multimodal, for example bimodal.

According to the invention the composition may also comprise further flame retardants, for example further phosphorus-containing flame retardants such as phosphoric esters. The composition preferably contains further phosphorus-containing flame retardants in an amount in the range from 2% to 10% by weight.

Suitable examples include derivatives of phosphoric acid, derivatives of phosphonic acid or derivatives of phosphinic acid or mixtures of two or more of these derivatives. Suitable further flame retardants may be liquid at 21° C. for example.

It is preferable when the derivatives of phosphoric acid, phosphonic acid or phosphinic acid are salts having an organic or inorganic cation or organic esters. Organic esters are derivatives of phosphorus-containing acids in which at least one oxygen atom directly bonded to the phosphorus is esterified with an organic radical. In a preferred embodiment the organic ester is an alkyl ester, in another preferred embodiment an aryl ester. It is particularly preferable when all hydroxyl groups of the corresponding phosphorus-containing acid are esterified. Examples of preferred phosphoric acid esters include 1,3-phenylene bis(diphenyl)phosphate, 1,3-phenylene bis(dixylenyl)phosphate and the corresponding oligomeric products having an average degree of oligomerization of n=3 to 6. A preferred resorcinol is resorcinol bis(diphenyl phosphate) (RDP) which is typically in the form of oligomers.

Further preferred phosphorus-containing flame retardants are bisphenol A bis(diphenyl phosphate) (BDP), which is typically in the form of an oligomer, and diphenylcresyl phosphate (DPC).

The composition of the invention further comprises at least one thermoplastic polyurethane. Thermoplastic polyurethanes are known in principle. Production is typically effected by reaction of the components (a) isocyanates and (b) isocyanate-reactive compounds and optionally (c) chain extenders optionally in the presence of at least one (d) catalyst and/or (e) customary auxiliaries and/or additives. The components (a) isocyanate, (b) isocyanate-reactive compounds, (c) chain extenders are also referred to individually or collectively as building block components.

In the context of the present invention the typically employed isocyanates and isocyanate-reactive compounds are suitable in principle.

Preferably employed organic isocyanates (a) include aliphatic, cycloaliphatic, araliphatic and/or aromatic isocyanates, more preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), 3,3'-dimethyl diphenyl diisocyanate, 1,2-diphenylethane diisocyanate and/or phenylene diisocyanate. It is particularly preferable to employ 4,4'-MDI.

In a further embodiment the present invention therefore relates to a composition as described hereinabove, wherein the thermoplastic polyurethane is based on diphenylmethane diisocyanate (MDI).

Employable isocyanate-reactive components (b) include in principle all suitable compounds known to those skilled in the art. According to the invention at least one diol is used as the isocyanate-reactive compound (b).

Any suitable diols may be employed in the context of the present invention, for example polyether diols or polyester diols or mixtures of two or more thereof.

Any suitable polyesterdiols may in principle be employed according to the invention, wherein in the context of the present invention the term polyesterdiol also comprises polycarbonate diols.

One embodiment of the present invention employs a polycarbonate diol or a polytetrahydrofuran polyol. Suitable polytetrahydrofuran polyols have a molecular weight for example in the range from 500 to 5000 g/mol, preferably 500 to 2000 g/mol, particularly preferably 800 to 1200 g/mol.

Suitable polycarbonate diols include for example polycarbonate diols based on alkanediols. Suitable polycarbonate diols are strictly difunctional OH-functional polycarbonate diols, preferably strictly difunctional OH-functional aliphatic polycarbonate diols. Suitable polycarbonate diols are for example based on 1,4-butanediol, 1,5-pentanediol or 1,6-hexanediol, in particular 1,4-butanediol, 1,5-pentanediol, 1,6-hexanediol, 3-methylpentane-(1,5)-diol or mixtures thereof, particularly preferably 1,4-butanediol, 1,5-pentanediol, 1,6-hexanediol or mixtures thereof. Preferably employed in the context of the present invention are polycarbonate diols based on 1,4-butanediol and 1,6-hexanediol, polycarbonate diols based on 1,5-pentanediol and 1,6-hexanediol, polycarbonate diols based on 1,6-hexanediol and mixtures of two or more of these polycarbonate diols.

The compositions according to the invention preferably comprise at least one thermoplastic polyurethane selected from the group consisting of thermoplastic polyurethanes based on at least one diisocyanate and at least one polycarbonate diol and thermoplastic polyurethanes based on at least one diisocyanate and polytetrahydrofuran polyol. Production of the polyurethanes present in the compositions according to the invention accordingly employs as component (b) at least one polycarbonate diol or a polytetrahydrofuran polyol.

In a further embodiment the present invention therefore relates to a composition as described hereinabove, wherein the thermoplastic polyurethane is selected from the group consisting of thermoplastic polyurethanes based on at least one diisocyanate and at least one polycarbonate diol and thermoplastic polyurethanes based on at least one diisocyanate and polytetrahydrofuran polyol. In a further embodiment the present invention therefore relates to a composition as described hereinabove, wherein the thermoplastic polyurethane is selected from the group consisting of thermoplastic polyurethanes based on at least one aromatic diisocyanate and at least one polycarbonate diol and thermoplastic polyurethanes based on at least one aromatic diisocyanate and polytetrahydrofuran polyol.

In a further embodiment the present invention also relates to a composition as described hereinabove, wherein the thermoplastic polyurethane is a thermoplastic polyurethane based on at least one diisocyanate and at least one polycarbonate diol. It is preferable when the employed polycarbonate diols have a number-average molecular weight Mn in the range from 500 to 4000 g/mol determined by GPC, preferably in the range from 650 to 3500 g/mol determined by GPC, particularly preferably in the range from 800 to 2500 g/mol determined by GPC.

In a further embodiment the present invention further relates to a composition as described hereinabove, wherein the thermoplastic polyurethane is a thermoplastic polyurethane based on at least one diisocyanate and at least one polycarbonate diol and the at least one polycarbonate diol is selected from the group consisting of polycarbonate diols based on 1,4-butanediol and 1,6-hexanediol, polycarbonate diols based on 1,5-pentanediol and 1,6-hexanediol, polycarbonate diols based on 1,6-hexanediol and mixtures of two or more of these polycarbonate diols. Also preferred are copolycarbonate diols based on the diols 1,5-pentanediol und 1,6-hexanediol, preferably having a molecular weight Mn of about 2000 g/mol.

In a further embodiment, the present invention therefore relates to a composition as described hereinabove, wherein the polycarbonate diol has a number-average molecular weight Mn in the range from 500 to 5000 g/mol determined by GPC, preferably in the range from 650 to 3500 g/mol determined by GPC, more preferably in the range from 800 to 2500 g/mol determined by GPC.

Preferably employable chain extenders (c) include aliphatic, araliphatic, aromatic and/or cycloaliphatic compounds having a molecular weight of 0.05 kg/mol to 0.499 kg/mol, preferably difunctional compounds, for example diamines and/or alkanediols having 2 to 10 carbon atoms in the alkylene radical, di-, tri-, tetra-, penta-, hexa-, hepta-, octa-, nona- and/or decaalkylene glycols having 3 to 8 carbon atoms, especially 1,2-ethylene glycol, 1,3-propanediol, 1,4-butanediol, 1,6-hexanediol, preferably corresponding oligo- and/or polypropylene glycols, wherein mixtures of the chain extenders may also be employed. The compounds (c) preferably have only primary hydroxyl groups, 1,4-butanediol or a mixture of 1,3-propanediol and 1,4-butanediol being very particularly preferred.

It is also possible according to the invention to employ a polyhydric alcohol, for example propanediol and/or a further diol, that has been obtained at least partially from renewable raw materials. It is possible that the polyhydric alcohol has been partially or entirely obtained from renewable raw materials. According to the invention at least one of the employed polyhydric alcohols may have been at least partially obtained from renewable raw materials.

So-called bio-1,3-propanediol is obtainable for example from maize and/or sugar. A further possibility is the conversion of glycerol wastes from biodiesel production. In a further preferred embodiment of the invention the polyhydric alcohol is 1,3-propanediol that has been at least partially obtained from renewable raw materials.

In a further embodiment the present invention accordingly relates to a composition as described hereinabove, wherein the thermoplastic polyurethane is based to an extent of at least 30% on renewable raw materials. One suitable method of determination is the C14 method for example.

In a preferred embodiment catalysts (d) which accelerate especially the reaction between the NCO groups of the diisocyanates (a) and the hydroxyl groups of the isocyanate-reactive compound (b) and the chain extender (c) are tertiary amines, especially triethylamine, dimethylcyclohexylamine, N-methylmorpholine, N,N'-dimethylpiperazine, 2-(dimethylaminoethoxy) ethanol, diazabicyclo[2.2.2]octane; in another preferred embodiment, these are organic metal compounds such as titanate esters, iron compounds, preferably iron (III) acetylacetonate, tin compounds, preferably tin diacetate, tin dioctoate, tin dilaurate or the dialkyltin salts of aliphatic carboxylic acids, preferably dibutyltin diacetate, dibutyltin dilaurate, or bismuth salts in which bismuth is preferably in the oxidation state 2 or 3, especially 3. Salts of carboxylic acids are preferred. Carboxylic acids employed are preferably carboxylic acids having 6 to 14 carbon atoms, particularly preferably having 8 to 12 carbon atoms. Examples of suitable bismuth salts are bismuth (III) neodecanoate, bismuth 2-ethylhexanoate and bismuth octanoate.

The catalysts (d) are preferably used in amounts of 0.0001 to 0.1 part by weight per 100 parts by weight of the isocyanate-reactive compound (b). It is preferable to employ tin catalysts, especially tin dioctoate.

Not only catalysts (d) but also customary auxiliaries (e) may be added to the synthesis components (a) to (c). Examples include surface-active substances, fillers, further flame retardants, nucleation agents, oxidation stabilizers, lubrication and demolding aids, dyes and pigments, optionally stabilizers, for example against hydrolysis, light, heat or discoloration, inorganic and/or organic fillers, reinforcers and plasticizers. Suitable auxiliary and additive substances may be found for example in Kunststoffhandbuch, volume VII, edited by Vieweg and Höchtlen, Carl Hanser Verlag, Munich 1966 (p. 103-113).

Production processes for thermoplastic polyurethanes are disclosed for example in EP 0 922 552 A1, DE 101 03 424 A1 or WO 2006/072461 A1. Production is typically effected on a belt apparatus or in a reactive extruder, but can also be effected on the laboratory scale, for example in a manual casting method. Depending on the physical properties of the components these are all mixed with one another directly or individual components are premixed and/or prereacted, for example to give prepolymers, and only then subjected to polyaddition. In a further embodiment a thermoplastic polyurethane is first produced from the building block components, optionally together with catalyst, into which auxiliaries may optionally also be incorporated. In that case, at least one flame retardant is introduced into this material and distributed homogeneously. Homogeneous distribution is preferably effected in an extruder, preferably in a twinscrew extruder. To adjust the hardness of the TPUs, the amounts used of building block components (b) and (c) can be varied within relatively broad molar ratios, typically with rising hardness as the content of chain extender (c) increases.

For producing thermoplastic polyurethanes, for example those having a Shore A hardness of less than 95, preferably from 95 to 80 Shore A, particularly preferably about 85A, the substantially difunctional polyhydroxyl compounds (b) and chain extenders (c) may advantageously be employed in molar ratios of 1:1 to 1:5, preferably 1:1.5 to 1:4.5 so that the resulting mixtures of the building block components (b) and (c) have a hydroxyl equivalent weight of greater than 200 and in particular from 230 to 450 while for producing harder TPUs, for example those having a Shore A hardness of greater than 98, preferably from 55 to 75 Shore D, the molar ratios of (b):(c) are in the range from 1:5.5 to 1:15, preferably from 1:6 to 1:12 so that the obtained mixtures of (b) and (c) have a hydroxyl equivalent weight of 110 to 200, preferably of 120 to 180.

The thermoplastic polyurethane employed according to the invention preferably has a hardness in the range from 68A to 100A determined according to DIN ISO 7619-1 (Shore hardness test A (3 s)), preferably in the range from 70A to 98A determined according to DIN ISO 7619-1, more preferably in the range from 75A to 95A determined according to DIN ISO 7619-1, particularly preferably in the range from 75A to 90A determined according to DIN ISO 7619-1, especially in the range from 78A to 85A determined according to DIN ISO 7619-1. In an alternative embodiment the employed thermoplastic polyurethane preferably has a hardness in the range from 70A to 80A determined according to DIN ISO 7619-1 (Shore hardness test A (3 s)).

In a further embodiment the present invention therefore relates to a composition as described hereinabove, wherein the thermoplastic polyurethane has a Shore hardness in the range from 80A to 100A determined according to DIN 53505.

For producing the thermoplastic polyurethanes employed according to the invention the building block components (a), (b) and (c), preferably in the presence of catalysts (d) and optionally auxiliaries and/or additives (e), are typically reacted in amounts such that the equivalent ratio of NCO groups of the diisocyanates (a) to the sum of the hydroxyl groups of the building block components (b) and (c) is 0.9 to 1.1:1, preferably 0.95 to 1.05:1 and especially about 1.0 to 1.04:1.

The composition according to the invention comprises the at least one thermoplastic polyurethane in an amount in the range from 60% by weight to 93% by weight based on the total composition, especially in the range from 65% by weight to 92% by weight based on the total composition, preferably in the range from 68% by weight to 90% by weight, more preferably in the range from 70% by weight to 88% by weight and particularly preferably in the range from 70% by weight to 85% by weight in each case based on the total composition.

In a further embodiment the present invention therefore relates to a composition as described hereinabove, wherein the proportion of the thermoplastic polyurethane in the composition is in the range from 60% by weight to 93% by weight based on the total composition.

The sum of all components in the composition amounts to 100% by weight in each case.

Preferably employed according to the invention are thermoplastic polyurethanes where the thermoplastic polyurethane has an average molecular weight ($M_W$) in the range from 50 000 to 500 000 Dalton. The upper limit for the average molecular weight ($M_W$) of the thermoplastic polyurethanes is generally determined by processibility as well as the spectrum of properties desired. It is more preferable when the thermoplastic polyurethane has an average molecular weight ($M_W$) in the range from 100,000 to 300,000 Da, more preferably in the range from 120,000 to 250,000 Da, especially preferably in the range from 150,000 250,000 Da.

In a further embodiment the present invention therefore relates to a composition as described hereinabove, wherein the thermoplastic polyurethane has an average molecular weight ($M_W$) in the range from 100 000 to 300 000 Da.

It has been found according to the invention that especially the use of thermoplastic polyurethanes having a molecular weight ($M_W$) in the range from 100 000 to 300 000 Da results in compositions having particularly advantageous combinations of properties.

It is also possible in accordance with the invention for the composition to comprise two or more thermoplastic polyurethanes differing for example in their average molecular weight or in their chemical composition. For example the composition according to the invention may comprise a first thermoplastic polyurethane TPU-1 and a second thermoplastic polyurethane TPU-2, for example a thermoplastic polyurethane TPU-1 based on an aliphatic diisocyanate and a further TPU-2 based on an aromatic diisocyanate.

An aliphatic isocyanate is used for producing the TPU-1 while an aromatic isocyanate is used for producing TPU-2.

Preferably employed organic isocyanates (a) for producing the TPU-1 are aliphatic or cycloaliphatic isocyanates, more preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate.

In a further embodiment the present invention therefore relates to a composition as described hereinabove, wherein the thermoplastic polyurethane TPU-1 is based on at least one aliphatic diisocyanate selected from the group consisting of hexamethylene diisocyanate and di(isocyanatocyclohexyl) methane.

Preferably employed organic isocyanates (a) for producing the TPU-2 R are araliphatic and/or aromatic isocyanates, more preferably 2,2'-, 2,4'- and/or 4,4'-diphenylmethane diisocyanate (MDI), 1,5-naphthylendiisocyanate (NDI), 2,4- and/or 2,6-tolylene diisocyanate (TDI), 3,3'-dimethyl diphenyl diisocyanate, 1,2-diphenylethane diisocyanate and/or phenylene diisocyanate. It is particularly preferable to use 4,4'-MDI.

In a further embodiment the present invention therefore relates to a composition as described hereinabove, wherein the thermoplastic polyurethane TPU-2 is based on diphenylmethane diisocyanate (MDI).

Preferably employed as isocyanate-reactive compounds (b) for TPU-1 and TPU-2 are a polycarbonate diol or a polytetrahydrofuran polyol. Suitable polytetrahydrofuran polyols have a molecular weight for example in the range from 500 to 5000, preferably 500 to 2000, particularly preferably 800 to 1200.

According to the invention preferably at least one polycarbonate diol, preferably an aliphatic polycarbonate diol, is used for producing the TPU-1 und the TPU-2. Suitable polycarbonate diols include for example polycarbonate diols based on alkanediols. Suitable polycarbonate diols are strictly difunctional OH-functional polycarbonate diols, preferably strictly difunctional OH-functional aliphatic polycarbonate diols. Suitable polycarbonate diols are for example based on butanediol, pentanediol or hexanediol, especially 1,4-butanediol, 1,5-pentanediol, 1,6-hexanediol, 3-methylpentane-(1,5)-diol or mixtures thereof, particularly preferably 1,4-butanediol, 1,5-pentanediol, 1,6-hexanediol or mixtures thereof. Preferably employed in the context of the present invention are polycarbonate diols based on butanediol and hexanediol, polycarbonate diols based on pentanediol and hexanediol, polycarbonate diols based on hexanediol and mixtures of two or more of these polycarbonate diols.

It is preferable when the polycarbonate diols used for producing the TPU-1 and the TPU-2 have a number-average molecular weight Mn in the range from 500 to 4000 determined by GPC, preferably in the range from 650 to 3500 determined by GPC, particularly preferably in the range from 800 to 3000 determined by GPC.

Preferably employable chain extenders (c) for producing the TPU-1 and the TPU-2 include aliphatic, araliphatic, aromatic and/or cycloaliphatic compounds having a molecular weight of 0.05 kg/mol to 0.499 kg/mol, preferably difunctional compounds, for example diamines and/or alkanediols having 2 to 10 carbon atoms in the alkylene radical, di-, tri-, tetra-, penta-, hexa-, hepta-, octa-, nona- and/or decaalkylene glycols having 3 to 8 carbon atoms, especially 1,2-ethylene glycol, 1,3-propanediol, 1,4-butanediol, 1,6-hexanediol, preferably corresponding oligo- and/or polypropylene glycols, wherein mixtures of the chain extenders may also be employed. The compounds (c) preferably have only primary hydroxyl groups and very particularly preference is given to employing mixtures of 1,4-butanediol with a further chain extender selected from the compounds recited above, for example mixtures comprising 1,4-butanediol and a second chain extender in a molar ratio in the range from 100:1 to 1:1, preferably in a range from 95:1 to 5:1, particularly preferably in a range from 90:1 to 10:1.

In a further embodiment the present invention therefore relates to a composition as described hereinabove, wherein a mixture of 1,4-butanediol and a further chain extender is employed as a chain extender to produce the thermoplastic polyurethane.

In order to adjust the hardness of TPU-1 oder TPU-2 the employed amounts of the building block components (b) and (c) may be varied over relatively wide molar ratios, wherein hardness typically increases with increasing content of chain extender (c).

According to the invention the TPU-1 preferably has a hardness in the range from 85A to 70D determined according to DIN ISO 7619-1, preferably in the range from 95A to 70D determined according to DIN ISO 7619-1, more preferably in the range from 55D to 65D determined according to DIN ISO 7619-1.

According to the invention the TPU-2 preferably has a hardness in the range from 70A to 70D determined according to DIN ISO 7619-1, more preferably in the range from 80A to 60D determined according to DIN ISO 7619-1, particularly preferably in the range from 80A to 90A determined according to DIN ISO 7619-1.

In a further embodiment the present invention therefore relates to a composition as described hereinabove, wherein the thermoplastic polyurethane TPU-1 has a Shore hardness in the range from 85A bis 65D determined according to DIN ISO 7619-1. In a further embodiment the present invention therefore relates to a composition as described hereinabove, wherein the thermoplastic polyurethane TPU-2 has a Shore hardness in the range from 70A bis 65D determined according to DIN ISO 7619-1.

The TPU-1 preferably has a molecular weight of more than 100 000 Da and the TPU-2 preferably has a molecular weight in the range from 150 000 to 300 000 Da. The upper limit for the number-average molecular weight of the thermoplastic polyurethanes is generally determined by the processibility and also the desired spectrum of properties.

In a further embodiment the present invention therefore relates to a composition as described hereinbove, wherein the thermoplastic polyurethane TPU-1 has a molecular weight in the range from 100 000 Da to 400 000 Da. In a further embodiment the present invention therefore relates to a composition as described hereinbove, wherein the thermoplastic polyurethane TPU-2 has a molecular weight in the range from 150 000 Da to 300 000 Da.

The composition according to the invention comprises the at least one thermoplastic polyurethane TPU-1 and the at least one thermoplastic polyurethane TPU-2 in a sum total amount in the range from 60% by weight to 93% by weight based on the total composition, especially in the range from 68% by weight to 92% by weight based on the total composition, preferably in the range from 70% by weight to 88% by weight, more preferably in the range from 70% by weight to 85% by weight in each case based on the total composition.

In the context of the present invention the ratio of the employed thermoplastic polyurethanes may be varied within a wide range. For example the thermoplastic polyurethane TPU-1 and the thermoplastic polyurethane TPU-2 are employed in a ratio in the range from 2:1 to 1:5. The thermoplastic polyurethane TPU-1 and the thermoplastic polyurethane TPU-2 are preferably employed in a ratio in the range from 1:1 to 1:5, more preferably in the range from 1:2 to 1:4, particularly preferably in the range from 1:2.5 to 1:3.

In a further embodiment the present invention accordingly relates to a composition as described hereinabove, wherein the composition comprises a mixture comprising thermoplastic polyurethane TPU-1 based on an aliphatic diisocyanate and a thermoplastic polyurethane TPU-2 based on an aromatic diisocyanate.

In one embodiment the compositions according to the invention are produced by processing the thermoplastic polyurethane and flame retardants (F1) and (F2) in one step. In other preferred embodiments the compositions according to the invention are produced by initially using a reaction extruder, a belt assembly or other suitable apparatus to produce a thermoplastic polyurethane, preferably as a granulate, into which the flame retardants (F1) and (F2) are then introduced in at least one further step, or else a plurality of steps.

The mixing of the thermoplastic polyurethane with the other components is effected in a mixing unit which is preferably an internal kneader or an extruder, preferably a twin-screw extruder. In a preferred embodiment at least one flame retardant introduced into the mixing unit in the at least one further step is liquid, i.e. liquid at a temperature of 21° C. In another preferred embodiment of the use of an extruder the introduced flame retardant is at least partially liquid at a temperature prevailing downstream of the filling point in the flow direction of the material in the extruder.

According to the invention the composition may comprise further flame retardants, also including phosphorus-containing flame retardants for example. For example the composition may comprise a further phosphorus-containing flame retardant (F3), for example phosphoric esters.

However, in an alternative embodiment the composition according to the invention comprises no further flame retardants in addition to the phosphorus-containing flame retardants (F1) and (F2).

In the context of the present invention the hardness of the compositions according to the invention may be varied within a wide range. The hardness of the composition may be for example in the range from 68A to 100A determined according to DIN ISO 7619-1 (Shore hardness test A (3s)), preferably in the range from 70A to 98A determined according to DIN ISO 7619-1.

Mechanical properties and flame retardancy properties are optimized according to the invention through the combination of the various flame retardants.

According to the invention the composition may also comprise further constituents, for example standard auxiliary and additive substances for thermoplastic polyurethanes. It is preferable when the composition contains no further flame retardants in addition to the at least one phosphorus-containing flame retardant (F1) and the at least one phosphorus-containing flame retardant (F2). It is more preferable when the composition according to the invention comprises precisely one phosphorus-containing flame retardant (F1) selected from the group consisting of melamine polyphosphates and precisely one phosphorus-containing flame retardant (F2) selected from the group consisting of derivatives of phosphinic acid.

The composition according to the invention may comprise fillers or dyes for example, preferably in an amount in the range from 0.1% to 5% by weight based on the total composition. In a further embodiment the present invention accordingly relates to a composition as described hereinabove, wherein the composition comprises titanium dioxide in an amount in the range from 0.1% to 5% by weight based on the total composition.

The present invention also relates to the use of the composition according to the invention comprising at least one flame-retarded thermoplastic polyurethane as described hereinabove for the production of coatings, damping elements, bellows, films or fibers, molded articles, floors for buildings and transport, nonwoven fabrics, preferably seals, rollers, shoe soles, hoses, cables, cable connectors, cable sheathings, cushions, laminates, profiles, belts, saddles, foams, plug connectors, trailing cables, solar modules, automotive trim. Use for the production of cable sheathings is preferred. Production is preferably effected from granulates by injection molding, calendering, powder sintering or extrusion and/or by additional foaming of the composition according to the invention.

Accordingly the present invention also relates to the use of a composition comprising at least one thermoplastic polyurethane, a first phosphorus-containing flame retardant (F1) selected from the group consisting of melamine polyphosphates and a further phosphorus-containing flame retardant (F2) selected from the group consisting of derivatives of phosphinic acid, wherein the composition is free from melamine cyanurate, as described hereinabove for the production of cable sheathings.

The compositions according to the invention allow the production of particularly thin cables, for example cables having an external diameter of less than 2 mm and a wall thickness of less than 0.5 mm. In a further embodiment the present invention accordingly also relates to the use of a composition as described hereinabove for the production of cable sheathings having a wall thickness in the range from 0.1 to 0.5 mm.

Further embodiments of the present invention are apparent from the claims and the examples. It will be appreciated that the features of the subject matter/process according to the invention or of the uses according to the invention recited hereinabove and elucidated hereinbelow may be used not only in the combination specified in each case but also in other combinations without departing from the scope of the invention. Thus for example the combination of a preferred feature with a particularly preferred feature or of a feature not characterized further with a particularly preferred feature etc. is thus also encompassed implicitly even if this combination is not mentioned explicitly.

Exemplary embodiments of the present invention are described hereinbelow but are not intended to restrict the present invention. In particular, the present invention also comprises embodiments that result from the dependency references and hence combinations specified hereinbelow.

1. Composition comprising at least the components (i) to (iii):
   (i) a thermoplastic polyurethane,
   (ii) a first phosphorus-containing flame retardant (F1) selected from the group consisting of melamine polyphosphates and
   (iii) a further phosphorus-containing flame retardant (F2) selected from the group consisting of derivatives of phosphinic acid,
   wherein the composition is free from melamine cyanurate.

2. Composition according to embodiment 1, wherein the composition is free from 3-, 4-, 5- and 6-hydric alcohols.

3. Composition comprising at least the components (i) to (iii):

(i) a thermoplastic polyurethane,
(ii) a first phosphorus-containing flame retardant (F1) selected from the group consisting of melamine polyphosphates and
(iii) a further phosphorus-containing flame retardant (F2) selected from the group consisting of derivatives of phosphinic acid,
wherein the composition is free from melamine cyanurate and
wherein the composition is free from 3-, 4-, 5- and 6-hydric alcohols.

4. Composition according to any of embodiments 1 to 3, wherein the phosphorus-containing flame retardant (F2) is a phosphinate.

5. Composition according to embodiment 4, wherein the phosphinate is selected from the group consisting of aluminum phosphinates or zinc phosphinates.

6. Composition comprising at least the components (i) to (iii):
(i) a thermoplastic polyurethane,
(ii) a first phosphorus-containing flame retardant (F1) selected from the group consisting of melamine polyphosphates and
iii) a further phosphorus-containing flame retardant (F2) selected from the group consisting of derivatives of phosphinic acid,
wherein the composition is free from melamine cyanurate,
wherein the phosphorus-containing flame retardant (F2) is a phosphinate and
wherein the phosphinate is selected from the group consisting of aluminum phosphinates or zinc phosphinates.

7. Composition according to any of embodiments 1 to 6, wherein the proportion of the sum of the phosphorus-containing flame retardant (F1) and the phosphorus-containing flame retardant (F2) in the composition is in the range from 7% to 40% by weight based on the total composition.

8. Composition comprising at least the components (i) to (iii):
(i) a thermoplastic polyurethane,
(ii) a first phosphorus-containing flame retardant (F1) selected from the group consisting of melamine polyphosphates and
(iii) a further phosphorus-containing flame retardant (F2) selected from the group consisting of derivatives of phosphinic acid,
wherein the composition is free from melamine cyanurate and
wherein the proportion of the sum of the phosphorus-containing flame retardant (F1) and the phosphorus-containing flame retardant (F2) in the composition is in the range from 7% to 40% by weight based on the total composition.

9. Composition according to any of embodiments 1 to 8, wherein the melamine polyphosphate has a phosphorus content in the range from 7% to 20% by weight.

10. Composition comprising at least the components (i) to (iii):
(i) a thermoplastic polyurethane,
(ii) a first phosphorus-containing flame retardant (F1) selected from the group consisting of melamine polyphosphates and
(iii) a further phosphorus-containing flame retardant (F2) selected from the group consisting of derivatives of phosphinic acid,
wherein the composition is free from melamine cyanurate,
wherein the composition is free from 3-, 4-, 5- and 6-hydric alcohols,
wherein the proportion of the sum of the phosphorus-containing flame retardant (F1) and the phosphorus-containing flame retardant (F2) in the composition is in the range from 7% to 50% by weight based on the total composition and
wherein the melamine polyphosphate has a phosphorus content in the range from 7% to 20% by weight.

11. Composition according to any of embodiments 1 to 10, wherein the melamine polyphosphate has a particle size in the range from 0.1 to 100 μm.

12. Composition according to any of embodiments 1 to 11, wherein the thermoplastic polyurethane is selected from the group consisting of thermoplastic polyurethanes based on at least one aromatic diisocyanate and at least one polycarbonate diol and thermoplastic polyurethanes based on at least one aromatic diisocyanate and polytetrahydrofuran polyol.

13. Composition according to any of embodiments 1 to 12, wherein the composition comprises a mixture comprising thermoplastic polyurethane TPU-1 based on an aliphatic diisocyanate and a thermoplastic polyurethane TPU-2 based on an aromatic diisocyanate.

14. Composition comprising at least the components (i) to (iii):
(i) a thermoplastic polyurethane,
(ii) a first phosphorus-containing flame retardant (F1) selected from the group consisting of melamine polyphosphates and
(iii) a further phosphorus-containing flame retardant (F2) selected from the group consisting of derivatives of phosphinic acid,
wherein the composition is free from melamine cyanurate.
wherein the composition is free from 3-, 4-, 5- and 6-hydric alcohols,
wherein the proportion of the sum of the phosphorus-containing flame retardant (F1) and the phosphorus-containing flame retardant (F2) in the composition is in the range from 7% to 40% by weight based on the total composition,
wherein the melamine polyphosphate has a phosphorus content in the range from 7% to 20% by weight and
wherein the composition comprises a mixture comprising thermoplastic polyurethane TPU-1 based on an aliphatic diisocyanate and a thermoplastic polyurethane TPU-2 based on an aromatic diisocyanate.

15. Composition according to any of embodiments 1 to 14, wherein the thermoplastic polyurethane is based to an extent of at least 30% on renewable raw materials.

16. Composition according to any of the embodiments 1 to 15, wherein a mixture of 1,4-butanediol and a further chain extender is employed as a chain extender to produce the thermoplastic polyurethane.

17. Composition according to any of embodiments 1 to 16, wherein the proportion of the thermoplastic polyurethane in the composition is in the range from 60% to 93% by weight based on the total composition.

18. Composition according to any of embodiments 1 to 17, wherein the composition comprises titanium dioxide in an amount in the range from 0.1% to 5% by weight based on the total composition.

19. Composition according to any of embodiments 1 to 18, wherein the composition has a Shore hardness in the range from 68A to 100A determined according to DIN ISO 7619-1 (Shore hardness test A (3s)).

20. Composition according to any of embodiments 1 to 19, wherein the proportion of the sum of the phosphorus-containing flame retardant (F1) and the phosphorus-containing flame retardant (F2) in the composition is in the range from 10% to 20% by weight based on the total composition.

21. Composition according to any of embodiments 1 to 20, wherein the proportion of the phosphorus-containing flame retardant (F1) in the composition is in the range from 2% to 15% by weight based on the total composition.

22. Composition according to any of embodiments 1 to 21, wherein the proportion of the phosphorus-containing flame retardant (F2) in the composition is in the range from 5% to 45% by weight based on the total composition.

23. Use of a composition according to any of embodiments 1 to 22 for the production of cable sheaths.

The examples which follow are intended to illustrate the invention but are in no way intended to restrict the subject matter of the present invention.

EXAMPLES

1. Input Materials

Elastollan A: TPU of Shore hardness 85A from BASF Polyurethanes GmbH, Elastogranstrasse 60, 49448 Lemförde, based on polytetrahydrofuran polyol (PTHF) having a molecular weight of 1000 g/mol, 1,4-butanediol, 4,4'-diphenylmethane diisocyanate.

Elastollan B: TPU of Shore hardness 90A from BASF Polyurethanes GmbH, Elastogranstrasse 60, 49448 Lemförde, based on polycarbonate polyol from Ube (Eternacoll PH-200D, based on 1,5-pentanediol and 1,6-hexanediol) having a molecular weight of 2000 g/mol, 1,4-butanediol, 4,4'-diphenylmethane diisocyanate.

Elastollan C: TPU of Shore hardness 60D from BASF Polyurethanes GmbH, Elastogranstrasse 60, 49448 Lemförde, based on polytetrahydrofuran polyol (PTHF) having a molecular weight of 1000 g/mol, 1,4-butanediol, 4,4'-diisocyanatodicyclohexylmethane.

TPU 1: TPU of Shore hardness 85A from BASF Polyurethanes GmbH, Elastogranstrasse 60, 49448 Lemförde, based on polytetrahydrofuran polyol (PTHF) having a molecular weight of 1000 g/mol, 1,4-butanediol and propanediol in a molar ratio of 3:1, 4,4'-diphenylmethane diisocyanate.

Melapur MC 15 ED: Melamine cyanurate (1,3,5-triazin-2,4,6 (1H,3H,5H)-trione, compound with 1,3,5-triazine-2,4,6-triamine (1:1)), CAS #: 37640-57-6, BASF SE, 67056 Ludwigshafen, GERMANY, particle size D99%</=50 μm, average particle diameter D50%<=4.5 μm, water content % (w/w)<0.2.

Melapur MC 200/70: Melamine polyphosphate (nitrogen content 42-44% by wt., phosphorous content 12-14% by wt.)), CAS #: 218768-84-4, BASF SE, 67056 Ludwigshafen, GERMANY, particle size D99%</=70 μm, average particle diameter D50%<=10 μm, water content % (w/w)<0.3.

Fyrolflex RDP: Resorcinol bis(diphenyl phosphate), CAS #: 125997-21-9, Supresta Netherlands B.V., Office Park De Hoef, Hoefseweg 1, 3821 AE Amersfoort, the Netherlands, viscosity at 25° C.=700 mPas, acid number<0.1 mg KOH/g, water content % (w/w)<0.1.

Disflamoll DPK: Cresyl diphenyl phosphate, CAS #: 026444-49-5, LANXESS Deutschland GmbH, 51369 Leverkusen, Germany, acid number<0.1 mg KOH/g, water content % (w/w)<0.1.

Exolit OP 1230: Aluminum diethylphosphinate, CAS #: 225789-38-8, Clariant Produkte (Deutschland) GmbH, Chemiepark Knapsack, 50351 Hürth, water content % (w/w)<0.2, particle size D99%</=90 μm, average particle diameter D50=20-40 μm.

Chisorb 622 LT: dimethyl butanedioate, polymer with 4-hydroxy-2,2,6,6-tetramethyl-1-piperidinethanol, CAS #: 65447-77-0, BASF Polyurethanes GmbH, Postfach 1140, 49440 Lemfoerde, GERMANY.

Tinuvin 234: 2-(2H-benzotriazol-2-yl)-4,6-bis(1-ethyl-1-phenylethylphenol) CAS #: 70321-86-17, BASF SE, 67056 Ludwigshafen, GERMANY.

Hombitan LW-S: Anatase microcrystals without surface treatment, CAS #: 1317-70-0, Sachtleben Chemie GmbH, Duisburg, GERMANY, TiO2 proportion 99.2%; average particle size 0.3 μm.

2. Production of the Mixtures

Tables 1a, 1b and 1c which follow list compositions in which the individual constituents are reported in parts by weight (pbw). The mixtures were in each case produced with a Berstorff ZE 40 A twin-screw extruder with a 35 D screw divided into 10 barrels.

All employed thermoplastic polyurethanes or mixtures of different polyurethanes have an average molecular weight of more than 150 000 Da.

TABLE 1a

|  | 1 (VB) | 2 (VB) | 3 (VB) | 4 | 5 (VB) | 6 (VB) |
|---|---|---|---|---|---|---|
|  | Composition | | | | | |
| Elastollan C | 23 | 23 | 23 | 23 | 23 | 23 |
| Elastollan A | 47 | 47 | 47 | 47 | 47 | 47 |
| Exolit OP 1230 | 30 |  |  | 20 |  |  |
| Disflamoll DPK |  | 30 |  |  | 20 |  |
| Fyrolflex RDP |  |  | 30 |  |  | 20 |
| Melapur 15 ED |  |  |  |  |  |  |
| MC 200/70 |  |  |  | 10 | 10 | 10 |

TABLE 1b

|  | 7 (VB) | 8 | 9 (VB) | 10 | 11 (VB) | 12 | 13 (VB) | 14 | 15 (VB) | 16 |
|---|---|---|---|---|---|---|---|---|---|---|
|  | Composition | | | | | | | | | |
| Elastollan C | 23 | 23 | 23 | 23 | 23 | 23 | 21.5 | 21.5 | 19 | 19 |
| Elastollan A | 47 | 47 | 47 | 47 | 47 | 47 | 43.5 | 43.5 | 41 | 41 |
| Exolit OP 1230 | 20 | 20 | 15 | 15 | 20 | 20 | 25 | 25 | 20 | 20 |
| Melapur MC 15 ED | 5 |  | 10 |  | 10 |  | 10 |  | 20 |  |
| Melapur 200/70 |  | 5 |  | 10 |  | 10 |  | 10 |  | 20 |

TABLE 1c

|  | 17 | 18 | 19 | 20 | 21 | 22 | 23 |
|---|---|---|---|---|---|---|---|
|  | Composition | | | | | | |
| Elastollan C |  | 15 | 15 | 23 | 31 |  | 15 |
| Elastollan A | 65.8 | 48.8 |  | 42.8 | 35.8 |  |  |
| Elastollan B |  |  | 48.8 |  |  |  |  |
| TPU 1 |  |  |  |  |  | 65.8 | 50.8 |
| Exolit OP 1230 | 20 | 20 | 20 | 20 | 20 | 20 | 20 |
| Melapur 200/70 | 10 | 10 | 10 | 10 | 10 | 10 | 10 |

TABLE 1c-continued

|  | 17 | 18 | 19 | 20 | 21 | 22 | 23 |
|---|---|---|---|---|---|---|---|
| Tinuvin 234 | 0.6 | 0.6 | 0.6 | 0.6 | 0.6 | 0.6 | 0.6 |
| Chisorb 622 | 0.6 | 0.6 | 0.6 | 0.6 | 0.6 | 0.6 | 0.6 |
| Hombitan LW-S | 3 | 3 | 3 | 3 | 3 | 3 | 3 |

TABLE 1d

|  | 24 | 25 |
|---|---|---|
| Composition | | |
| Elastollan A | 70.8 | 70.8 |
| Exolit OP 1230 | 10 | 15 |
| Fyrolflex RDP | 10 | 2 |
| Melapur MC 200/70 | 5 | 8 |
| Tinuvin 234 | 0.6 | 0.6 |
| Chisorb 622 | 0.6 | 0.6 |
| Hombitan LW-S | 3 | 3 |

3. Mechanical Properties

The mixtures were extruded with an Arenz single-screw extruder having a three-zone screw with a mixing section (screw ratio 1:3) to afford films having a thickness of 1.6 mm. Density, Shore hardness, tensile strength, tear propagation resistance, abrasion and elongation at break of the corresponding test specimens were measured. All compositions have good mechanical properties. The results are summarized in the following tables 2a, 2b and 2c.

TABLE 2a

|  | Composition | | | | | |
|---|---|---|---|---|---|---|
|  | 1 (VB) | 2 (VB) | 3 (VB) | 4 | 5 (VB) | 6 (VB) |
| Viscosity | | | | | | |
| MFR [g/10 min] 200° C., 5.00 kg | 29 | 89 | 57 | 18 | 72 | 56 |
| Standard mechanics | | | | | | |
| Density [g/cm³] | 1.18 | 1.16 | 1.18 | 1.20 | 1.19 | 1.22 |
| Shore [A] | 85 | 57 | 66 | 88 | 70 | 71 |
| TS [MPa] | 26 | 34 | 45 | 26 | 29 | 35 |
| EB [%] | 420 | 580 | 550 | 430 | 550 | 540 |
| TPR [kN/m] | 51 | 29 | 32 | 60 | 38 | 44 |
| Abrasion [mm³] | 137 | 74 | 89 | 157 | 108 | 115 |

TABLE 2b

|  | Composition | | | | | | | | | |
|---|---|---|---|---|---|---|---|---|---|---|
|  | 7 (VB) | 8 | 9 (VB) | 10 | 11 (VB) | 12 | 13 (VB) | 14 | 15 (VB) | 16 |
| Viscosity | | | | | | | | | | |
| MFR [g/10 min] (200° C./5 kg) | 26 | 29 | 23 | 27 | 23 | 18 | 26 | 13 | 21 | 16 |
| Standard mechanics | | | | | | | | | | |
| Density [g/cm³] | 1.21 | 1.18 | 1.21 | 1.18 | 1.21 | 1.19 | 1.22 | 1.22 | 1.26 | 1.27 |
| Shore [A] | 88 | 89 | 87 | 87 | 85 | 88 | 91 | 90 | 92 | 92 |
| TS [MPa] | 28 | 29 | 27 | 28 | 24 | 26 | 18 | 22 | 16 | 15 |
| EB [%] | 470 | 480 | 450 | 470 | 410 | 430 | 380 | 410 | 360 | 380 |
| TPR [kN/m] | 59 | 62 | 64 | 61 | 56 | 60 | 55 | 63 | 58 | 59 |
| Abrasion [mm³] | 120 | 123 | 137 | 138 | 135 | 157 | 174 | 169 | 160 | 201 |

TABLE 2c

|  | Composition | | | | | | |
|---|---|---|---|---|---|---|---|
|  | 17 | 18 | 19 | 20 | 21 | 22 | 23 |
| Viscosity | | | | | | | |
| MFR [g/10 min] (200° C./5 kg) | 19 | 25 | 20 | 32 | 64 | 23 | 29 |
| Standard mechanics | | | | | | | |
| Density [g/cm³] | 1.20 | 1.21 | 1.23 | 1.22 | 1.22 | 1.20 | 1.21 |
| Shore A [A] | 87 | 88 | 90 | 90 | 91 | 86 | 87 |
| TS [MPa] | 21 | 21 | 22 | 20 | 19 | 21 | 21 |
| EB [%] | 470 | 540 | 500 | 560 | 540 | 470 | 480 |
| TPR [kN/m] | 56 | 56 | 60 | 57 | 58 | 53 | 53 |
| Abrasion [mm³] | 183 | 164 | 170 | 178 | 186 | 156 | 152 |

TABLE 2d

|  | Composition | |
|---|---|---|
|  | 24 | 25 |
| Viscosity | | |
| MFR [g/10 min]; 200° C., 21.6 kg |  | 20 |
| MFR [g/10 min]; 190° C., 21.6 kg | 35 |  |
| Standard mechanics | | |
| Density [g/cm³] | 1.16 | 1.18 |
| Shore [A] | 76 | 88 |
| Tensile strength [MPa] | 34 | 36 |
| Elongation at break [%] | 710 | 510 |
| Tear propagation resistance [kN/m] | 40 | 55 |
| Abrasion [mm³] | 70 | 65 |

TABLE 3

| Test | Composition | | | | | | |
|---|---|---|---|---|---|---|---|
|  | 17 | 18 | 19 | 20 | 21 | 22 | 23 |
| Stickiness determination | | | | | | | |
| Wound cables stick | no | no | no | a little | a lot | no | no |
| Resilience | | | | | | | |
| Cables assume shape of cable drum | a lot | a little | a little | a little | a little | no | no |

4. Flame Retardancy

To assess flame retardancy a conventional extrusion line (smooth tube extruder, extruder diameter 45 mm) for cable insulation and cable sheathing was used to produce cables. A conventional three-zone screw with a compression ratio of 2.5:1 was employed.

Initially the cores (4 twisted individual wires) were insulated with 0.1 mm of the respective mixtures by the hose method. The diameter of the insulated cores was 0.7 mm. Three of these cores were stranded and a sheath (sheath thickness 0.3 mm) was applied by extrusion by the hose method. The external diameter of the overall cable was 2 mm.

A VW 1 test (UL Standard 1581, § 1080-VW-1 (vertical specimen) flame test) was then performed on the cables. The test was performed on 3 cables in each case. The results are summarized in table 4.

TABLE 4

| Composition | Fire test (VW 1 test) |
|---|---|
| 1 (VB) | 0/3 |
| 2 (VB) | 0/3 |
| 3 (VB) | 0/3 |
| 4 | 3/3 |
| 5 (VB) | 0/3 |
| 6 (VB) | 0/3 |
| 7 (VB) | 0/3 |
| 8 | 2/3 |
| 9 (VB) | 0/3 |
| 10 | 2/3 |
| 11 (VB) | 1/3 |
| 12 | 3/3 |
| 13 (VB) | 1/3 |
| 14 | 3/3 |
| 15 (VB) | 1/3 |

TABLE 4-continued

| Composition | Fire test (VW 1 test) |
|---|---|
| 16 | 3/3 |
| 17 | 3/3 |
| 18 | 3/3 |
| 19 | 3/3 |
| 20 | 3/3 |
| 21 | 3/3 |
| 22 | 3/3 |
| 23 | 3/3 |

TABLE 4b

| Composition | Fire test (VW 1 Test) |
|---|---|
| 24 | 3/3 |
| 25 | 3/3 |

The results show that the inventive materials show improved flame retardancy properties. While positive fire test (VW 1 test) results were likewise obtained in individual tests for comparative experiments 13 and 15 this required a greater amount of flame retardant in the composition.

The advantage of the further addition of Fyroflex RDP (or another P-containing plasticizer liquid at RT) to the composition according to the invention is firstly the plasticizing effect without loss of flame retardancy properties (compare composition 17 to 24). The addition of RDP moreover considerably simplifies cable extrusion; much less nozzle abrasion material is formed.

5. Discoloration Upon UV Irradiation

The mixtures were extruded with an Arenz single-screw extruder having a three-zone screw with a mixing section (screw ratio 1:3) to afford films having a thickness of 1.6 mm. The delta E values (ASTM E313) of the corresponding test specimens were measured after different irradiation times according to the method ASTM G155 Cy4. The results are summarized in table 5 which follows.

A small value for delta E represents a relatively low level of discoloration caused by the test. The lower the level of discoloration in the test the lower the level of discoloration that is to be expected in practical use, for example under the influence of sunlight.

The results show that the inventive materials show improved properties, in particular good long-term stability.

TABLE 5

| | | Composition | | | | | | |
|---|---|---|---|---|---|---|---|---|
| Test | | 17 | 18 | 19 | 20 | 21 | 22 | 23 |
| | | Irradiation | | | | | | |
| Color difference delta E | 0 h | 0/0 | 0/0 | 0/0 | 0/0 | 0/0 | 0/0 | 0/0 |
| | 100 h | 2.6/2.4 | 1.7/1.6 | 1.6/1.5 | 1.5/1.4 | 1.1/1.0 | 2.5/2.4 | 1.7/1.5 |
| | 200 h | 4.1/3.9 | 2.9/2.9 | 2.8/2.8 | 2.2/2.1 | 1.7/1.7 | 4.2/4.0 | 2.8/2.9 |
| | 300 h | 5.0/4.9 | 3.5/3.4 | 3.4/3.3 | 3.0/2.9 | 2.1/2.0 | 5.2/5.1 | 3.4/3.4 |

The inventive combination of a phosphinate with MPP (inventive examples 4, 8, 10, 12, 14, 16 and 17-23) gives better flame retardancy results than the combination of the phosphinate with MC.

Example 18, 19 and 23 are advantageous since good UV resistance is achieved alongside very low stickiness. Example 23 is particularly advantageous since good mechanical properties (tensile strength) are combined with good flame retardancy, good UV resistance and low resilience.

6. Methods of Measurement:
Density: DIN EN ISO 1183-1, A.
Shore A hardness: DIN ISO 7619-1, Shore hardness test A (3s)
Tensile strength: DIN EN ISO 527
Elongation at break: DIN EN ISO 527
Tear propagation resistance: DIN ISO 34-1, B (b)
Abrasion: DIN 53516
Fire test: VW 1 test Color difference delta E: ASTMG 155 Cy 4-without/with gloss

CITED LITERATURE

EP 0 617 079 A2
WO 2006/121549 A1
WO 03/066723 A2
US 2013/0059955 A1
US 2013/0081853 A1
WO 97/00916 A
EP 0 019 768 A1
WO 03/066723 A1
WO 2006/121549 A1
PCT/EP2015/053192
EP 0 922 552 A1
DE 101 03 424 A1
WO 2006/072461 A1
Kunststoffhandbuch, volume VII, edited by Vieweg and Höchtlen, Carl Hanser Verlag, Munich 1966 (p. 103-113)

The invention claimed is:

1. A composition, comprising:
   (i) a thermoplastic polyurethane, wherein polyether diols or polycarbonate diols are used to produce the thermoplastic polyurethane,
   (ii) a melamine polyphosphate as a first phosphorus-containing flame retardant (F1) in an amount of from 5% to 20% by weight based on a total composition,
   (iii) a phosphinic acid derivative as a second phosphorus-containing flame retardant (F2) in an amount of from 10% to 35% by weight based on the total composition, and
   (iv) a third phosphorus-containing flame retardant, which is a liquid phosphoric ester at 21° C., in an amount of from 2% to 10% by weight based on the total composition,
   wherein the third phosphorus-containing flame retardant is selected from the group consisting of 1,3-phenylene bis(diphenyl)phosphate; 1,3-phenylene bis(dixylenyl) phosphate; resorcinol bis(diphenyl phosphate) (RDP); bisphenol A bis(diphenyl phosphate) (BDP); and diphenyl cresyl phosphate (DPC);
   wherein the composition is free from melamine cyanurate, and
   wherein the phosphorus-containing flame retardants in the composition consist of those selected from (ii), (iii), and (iv).

2. The composition according to claim 1, wherein the composition is free from 3-, 4-, 5- and 6-hydric alcohols.

3. The composition according to claim 1, wherein the second phosphorus-containing flame retardant (F2) is a phosphinate.

4. The composition according to claim 3, wherein the phosphinate is selected from the group consisting of an aluminum phosphinate and a zinc phosphinate.

5. The composition according to claim 1, wherein the melamine polyphosphate has a phosphorus content of from 7% to 20% by weight.

6. The composition according to claim 1, wherein the melamine polyphosphate has a particle size of from 0.1 to 100 μm.

7. The composition according to claim 1, wherein the thermoplastic polyurethane is selected from the group consisting of a thermoplastic polyurethane based on at least one aromatic diisocyanate and at least one polycarbonate diol and a thermoplastic polyurethane based on at least one aromatic diisocyanate and polytetrahydrofuran polyol.

8. The composition according to claim 1, wherein the composition comprises a mixture comprising thermoplastic polyurethane TPU-1 based on an aliphatic diisocyanate and thermoplastic polyurethane TPU-2 based on an aromatic diisocyanate.

9. The composition according to claim 1, wherein a mixture of 1,4-butanediol and a further chain extender is employed as a chain extender to produce the thermoplastic polyurethane.

10. The composition according to claim 1, wherein the thermoplastic polyurethane is present in the composition in an amount of from 60% to 93% by weight based on the total composition.

11. The composition according to claim 1, wherein the composition comprises titanium dioxide in an amount of from 0.1% to 5% by weight based on the total composition.

12. A cable sheathing, comprising the composition according to claim 1.

13. The composition according to claim 1, wherein the third phosphorus-containing flame retardant is selected from the group consisting of resorcinol bis(diphenyl phosphate) (RDP) and diphenyl cresyl phosphate (DPC).

14. The composition according to claim 13, wherein the thermoplastic polyurethane is selected from the group consisting of a thermoplastic polyurethane based on at least one aromatic diisocyanate and at least one polycarbonate diol and a thermoplastic polyurethane based on at least one aromatic diisocyanate and polytetrahydrofuran polyol.

15. The composition according to claim 14, wherein the melamine polyphosphate has a phosphorus content of from 7% to 20% by weight.

16. The composition according to claim 14, wherein the second phosphorus-containing flame retardant (F2) is a phosphinate.

17. The composition according to claim 16, wherein the phosphinate is selected from the group consisting of an aluminum phosphinate and a zinc phosphinate.

18. The composition according to claim 17, wherein the thermoplastic polyurethane is present in the composition in an amount of from 60% to 93% by weight based on the total composition.

19. The composition according to claim 17, wherein the third phosphorus-containing flame retardant is resorcinol bis(diphenyl phosphate) (RDP).

20. The composition according to claim 17, wherein the third phosphorus-containing flame retardant is diphenyl cresyl phosphate (DPC).

21. A composition, comprising:
   (i) a thermoplastic polyurethane, wherein polyether diols or polycarbonate diols are used to produce the thermoplastic polyurethane,
   (ii) a melamine polyphosphate as a first phosphorus-containing flame retardant (F1) in an amount of from 5% to 20% by weight based on a total composition,
   (iii) a phosphinic acid derivative as a second phosphorus-containing flame retardant (F2) in an amount of from 10% to 35% by weight based on the total composition, and
   (iv) a third phosphorus-containing flame retardant, which is a liquid phosphoric ester at 21° C., in an amount of from 2% to 10% by weight based on the total composition,
   wherein the third phosphorus-containing flame retardant is selected from the group consisting of 1,3-phenylene bis(diphenyl)phosphate; 1,3-phenylene bis(dixylenyl)

phosphate; resorcinol bis(diphenyl phosphate) (RDP); bisphenol A bis(diphenyl phosphate) (BDP); and diphenyl cresyl phosphate (DPC);

wherein the composition is free from melamine cyanurate, and wherein the composition does not comprise alkyl esters of phosphoric acid.

* * * * *